(12) United States Patent
Fields et al.

(10) Patent No.: US 6,347,943 B1
(45) Date of Patent: *Feb. 19, 2002

(54) METHOD AND SYSTEM FOR CREATING AN INDIVIDUALIZED COURSE OF INSTRUCTION FOR EACH USER

(75) Inventors: Daniel Fields, New York; Wayne Plourde, Bayside; William Donahue, Brooklyn; Constantin B. Ohanian, West Hampton; Ara A. Ohanian, Roslyn, all of NY (US)

(73) Assignee: Vuepoint Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,401

(22) Filed: Oct. 20, 1997

(51) Int. Cl.⁷ .............................................. G09B 19/00
(52) U.S. Cl. ...................... 434/118; 434/322; 434/350; 434/362
(58) Field of Search ................................ 434/322, 350, 434/362, 18

(56) References Cited

U.S. PATENT DOCUMENTS

| | | | | |
|---|---|---|---|---|
| 4,764,120 A | * | 8/1988 | Griffin et al. | 434/336 |
| 4,767,335 A | * | 8/1988 | Curt | 434/352 |
| 5,002,491 A | * | 3/1991 | Abrahamson et al. | 434/322 |
| 5,176,520 A | * | 1/1993 | Hamilton | 434/350 |
| 5,204,813 A | * | 4/1993 | Samph et al. | 434/362 |
| 5,243,531 A | | 9/1993 | Dipippo et al. | |
| 5,263,869 A | | 11/1993 | Ziv-El | |
| 5,267,865 A | | 12/1993 | Lee et al. | |
| 5,306,154 A | | 4/1994 | Ujita et al. | |
| 5,310,349 A | * | 5/1994 | Daniels et al. | 434/350 |
| 5,316,485 A | | 5/1994 | Hirose | |
| 5,318,450 A | * | 6/1994 | Carver | 434/336 |
| 5,326,270 A | | 7/1994 | Ostby et al. | |
| 5,372,507 A | | 12/1994 | Goleh | |
| 5,387,104 A | | 2/1995 | Corder | |
| 5,395,243 A | | 3/1995 | Lubin et al. | |
| 5,437,554 A | | 8/1995 | Clark et al. | |
| 5,437,555 A | | 8/1995 | Ziv-El | |
| 5,441,415 A | | 8/1995 | Lee et al. | |
| 5,458,494 A | * | 10/1995 | Krohn et al. | 434/336 |
| 5,513,994 A | * | 5/1996 | Kershaw et al. | 434/350 |
| 5,590,360 A | | 12/1996 | Edwards | |
| 5,597,312 A | | 1/1997 | Bloom et al. | |
| 5,602,982 A | | 2/1997 | Judd et al. | |
| 5,727,950 A | * | 3/1998 | Cook et al. | 434/350 |
| 5,788,508 A | * | 8/1998 | Lee et al. | 434/350 |
| 5,800,181 A | * | 9/1998 | Heinlein et al. | 434/322 |
| 5,810,598 A | * | 9/1998 | Wakamoto | 434/156 |
| 5,813,863 A | * | 9/1998 | Sloane et al. | 434/236 |
| 5,823,788 A | * | 10/1998 | Lemelson et al. | 434/350 |
| 5,829,983 A | * | 11/1998 | Koyama et al. | 434/118 |
| 5,836,771 A | * | 11/1998 | Ho et al. | 434/362 |
| 5,879,163 A | * | 3/1999 | Brown et al. | 434/236 |
| 5,904,485 A | * | 5/1999 | Siefert | 434/322 |
| 5,915,973 A | * | 6/1999 | Hoehn-Saric et al. | 434/350 |
| 5,957,698 A | * | 9/1999 | Dean et al. | 434/350 |
| 5,957,699 A | * | 9/1999 | Peterson et al. | 434/350 |
| 6,039,575 A | * | 3/2000 | L'Allier et al. | 434/323 X |

* cited by examiner

*Primary Examiner*—Valencia Martin-Wallace
*Assistant Examiner*—Chanda Harris
(74) *Attorney, Agent, or Firm*—Kenyon & Kenyon

(57) ABSTRACT

An electronic performance support system is provided for creating individualized courses of instruction to each user. An authoring mechanism is used to create at least one knowledge base relating to a particular topic. An assessment mechanism evaluates each user's knowledge on a particular topic and devises a course of instruction based on the assessed knowledgeability of each user. After interacting with the assessment mechanism, each user navigates through a corresponding, individualized course of instruction. Each individualized course of instruction includes data items selected from a learning mechanism and a research library. The system may include a communication medium through which users are able to communicate with each other.

27 Claims, 8 Drawing Sheets

METHOD AND SYSTEM FOR CREATING AN INDIVIDUALIZED COURSE OF INSTRUCTION FOR EACH USER

BACKGROUND INFORMATION

The present invention is directed to an electronic performance support system (EPSS), and, in particular, to an EPSS that is capable of providing for each user a customized course of instruction based on an assessment of each user's knowledgeability of a particular topic.

The computer has changed the way people learn, opening up a myriad of new and ever-expanding possibilities for acquiring knowledge. Although the traditional classroom still remains the predominant vehicle for this pursuit of knowledge, computer-based training methods have permanently changed how the traditional classroom operates. Computer terminals at every desk are no longer the exclusive domain of computer programming classes. No longer is it a curious novelty for computers to serve as an aid to students and instructors in such non-technical disciplines as foreign languages. Further, with the expansion of computer networking, students are now able to access vast repositories of knowledge that are maintained elsewhere at remotely located computers or network servers. Moreover, these computer learning environments have expanded into the workplace, where business managers, who are always searching for new ways to increase employee productivity and improve competitiveness, require certain employees to learn more about their particular business. Computer learning environments that are dedicated to such purposes may instruct employees on improving certain aspects of their duties, such as sales or customer service, or these computer learning environments may instead be programmed to educate workers on new or existing products and services offered by a particular employer.

These computer-based training systems typically comprise a pre-programmed course of instruction maintained in memory, either at the user's terminal or at a remote location that is accessible by the user's terminal. For example, in a university setting, the course of instruction may relate to a foreign language. After logging on to such a system, the user is presented on a terminal display with various materials from the programmed course of instruction. Since these materials are arranged in a pre-determined viewing order, every user navigates through these materials over the same path, with little or no possibility of deviating to any extent from this pre-determined order. For those users who wish to focus only on certain specific sub-topics of the particular topic at hand, a tedious, plodding exercise results in which the users must navigate through each of the pre-programmed sub-topics in order to arrive at those sub-topics that are of interest to them. With respect to such users requiring a narrower focus on the materials, a lower teaching efficiency results. Further, these systems do not allow remote users to communicate with each other while they are interacting with the computer learning environment; such an inability to communicate forecloses users from sharing each other's unique observations and insights on the learning materials.

Thus, one drawback of certain of these computer-based training systems is their inflexibility in presenting pre-stored course materials; what is therefore needed is a computer learning environment that can customize the presentation of such materials for each individual user. Another drawback is the inability of prior computer learning environments to allow users to communicate with each other through their respective terminals. Therefore, what is also needed is a computer learning environment that includes a communication medium through which users can interact with each other. Yet another drawback to such systems is the high degree of expertise in computer programming that is required to create a computer learning environment for a particular topic. What is therefore required is a computer learning environment that can be programmed by programming novices.

SUMMARY OF THE INVENTION

Therefore, an object of the present invention is to provide an electronic performance support system that provides each user with an individualized course of instruction relating to a particular topic.

In accordance with these objects, the system of the present invention includes an authoring mechanism for creating at least one knowledge base, each knowledge base relating to a particular topic. Associated with each knowledge base is a learning environment, through which each user accesses the course content of a particular knowledge base. Each user interacts with the learning environment through an associated computer terminal. The learning environment includes an assessment mechanism, a learning mechanism, and a research library. The assessment mechanism is populated through the authoring mechanism with a plurality of pages, each one of which includes an assessment tool for evaluating a user's knowledge on a particular sub-topic. Each assessment page is linked by the authoring mechanism to one or more data items that populate the learning mechanism and research library. These data items are also supplied into the learning environment and the research library through the authoring mechanism. The data items that are linked to an assessment page all relate to the same sub-topic that the associated assessment page addresses.

A user first interacts with the assessment mechanism of the present invention. The assessment mechanism presents each user with a series of assessment pages, with which the user interacts to deliver a response. The assessment tool of each assessment page may include a multiple choice question, a fill-in-the-blank question, or any other data structure to which a response from a user is required. After the user completes navigating through the assessment mechanism, the assessment mechanism determines which assessment tools were responded to incorrectly by the user. For these incorrectly answered assessment tools, the system of the present invention retrieves from the learning mechanism and research library those data items that were previously linked by the authoring mechanism to the incorrectly answered assessment tool. As stated above, these retrieved data items contain information relating only to the sub-topic that was addressed by the associated assessment tool. Thus, the system of the present invention provides to each user information that relates only to those sub-topics for which each user was assessed as being inadequately knowledgeable.

The system of the present invention also includes a communication medium that allows each user to communicate with any other user who is currently accessing the system of the present invention.

DETAILED DESCRIPTION

The preceding detailed description references the accompanying drawings and illustrates a specific embodiment in which the present invention may be practiced. It should be appreciated that other embodiments which achieve the objects of the present invention are intended to be included within the scope of the appended claims.

General Description

The EPSS of the present invention is an Intra/Internet based learning system that creates, accesses, captures, stores, and distributes knowledge interactively to any number of users. A user may interact with the EPSS of the present invention through an associated general purpose computer terminal that is connected by any suitable means to the EPSS.

Figure 1:
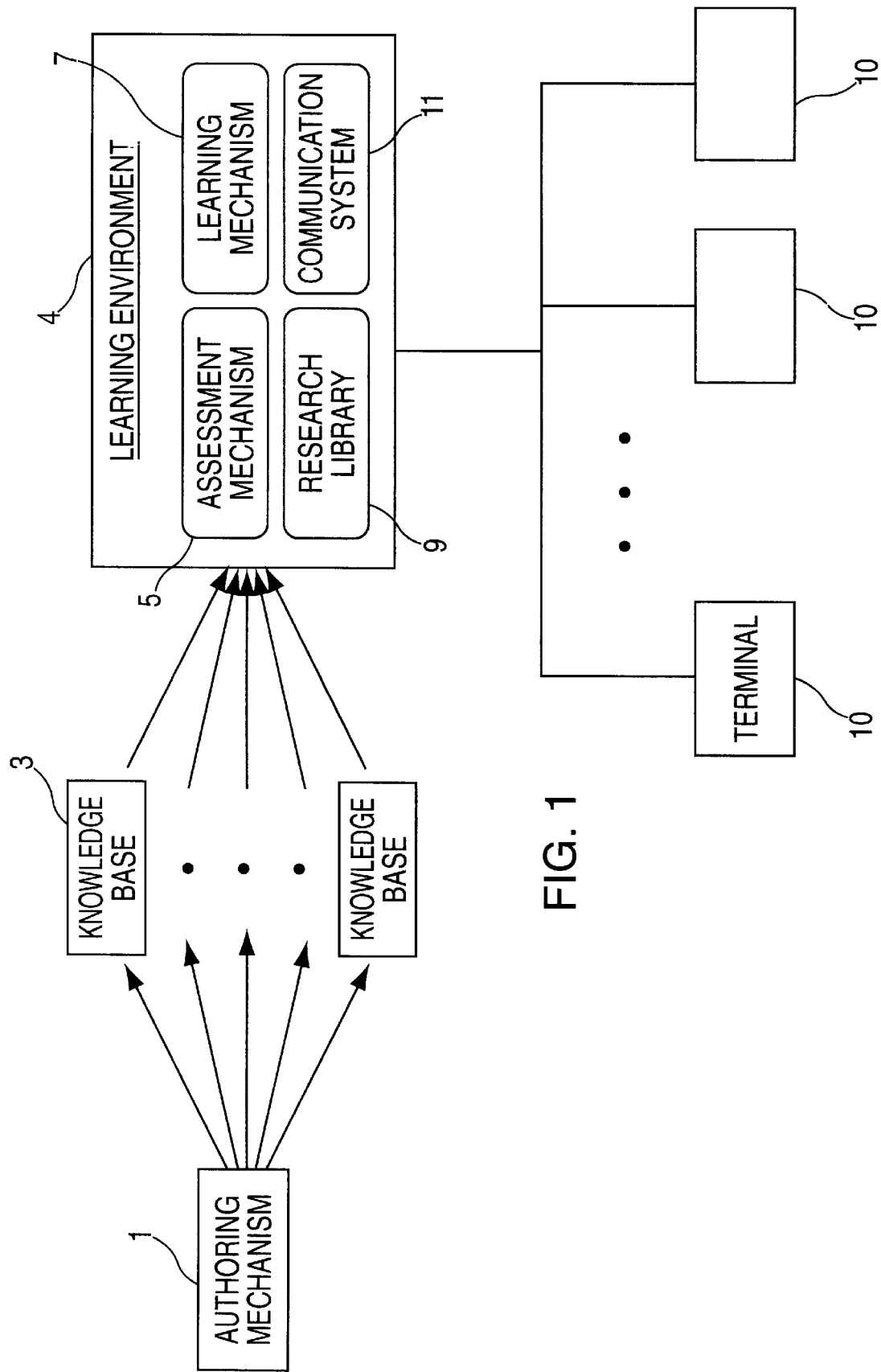
FIG. 1 is a schematic block diagram that represents the relationships between the authoring mechanism, the knowledge bases, and the learning environment.

FIG. 1 illustrates the basic organization of the EPSS. The authoring mechanism 1 enables non-programmer authors to create interactive courses by entering instructional content into one or more knowledge bases 3. EPSS users interact with the knowledge bases 3 through a learning environment 4 including an assessment mechanism 5, learning mechanism 7, research library 9, and communication system 11. An EPSS user may access the learning environment 4 by operating one of at least one terminal 10 that has been coupled to the learning environment 4.

A knowledge base 3 refers to the authored instructional content and all information in the research library 9 that covers one subject. Individual knowledge bases may cover any subject, such as, for example, a tutorial for a college course or a training mechanism for a particular job. Users interact with and learn from a knowledge base 3 through the learning environment 4.

Inside the learning environment 4, the assessment mechanism 5 tests a user's understanding of a knowledge base 3 and creates for each user a customized learning pathway based on the results of the assessment. This customized learning pathway includes, as shall be later explained in more detail, a plurality of links to data items that have been previously authored by a course content author, who may be, for example, a college professor or a business manager. The customized learning pathway may also include links to data items found in the research library 9. The learning mechanism 7 teaches the user by presenting on a display of the terminal 10 those linked data items that are included in the customized learning pathway. The research library 9 contains in-depth reference documents and resources that augment the authored instructional content in the knowledge base 3. The data items authored by the course content author and the data items found in the research library 9 may include text-only documents, or they may comprise multimedia documents capable of providing instructional content in a visual or audible format as well. The communication system 11 allows users to communicate directly with one another through their respective terminals 10.

Physical Embodiment

The EPSS is a client/server-based network application that can run on a Web server, like Windows NT or UNIX, for example. The Web server could be an intranet server connected to a local network, or an internet server accessible to the public. The network should be transparent to the user.

The EPSS may be written in a programming language, such as VisualBasic 5.0 or Java 1.1, for example, that supports an event-driven windowing environment. The Java programming language works well because it is platform independent. Using Java allows the EPSS to run on any type of computer (e.g., PC, Mac, UNIX, etc.) that contains the Java Virtual Machine because Java is a platform-independent programming language. Java enables customers to access the EPSS from an applet viewer or Web browser, such as Netscape, so that anyone with internet access can run the EPSS from their computer.

File Management

Figure 5:
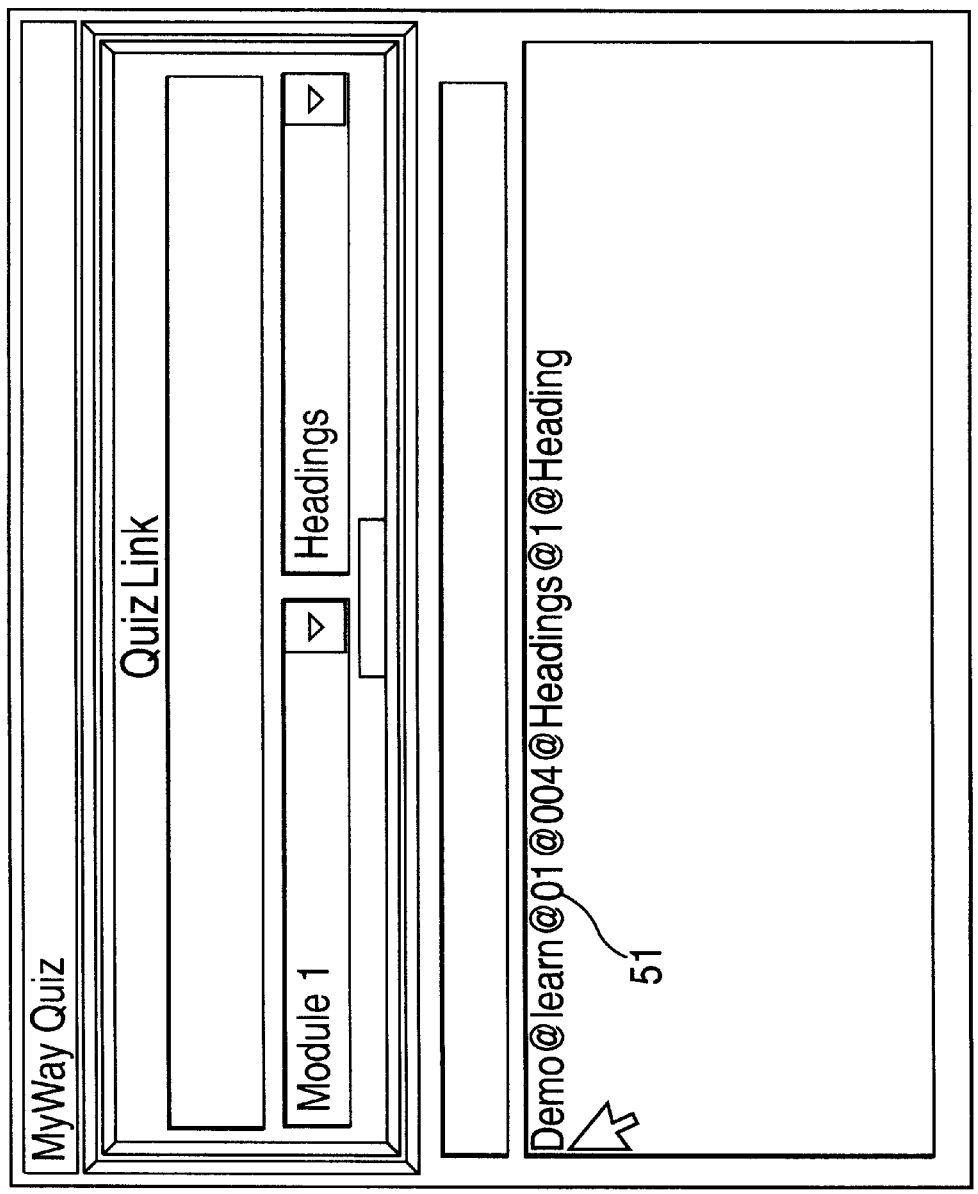
FIG. 5 is a graphical user interface for linking an assessment page with a learn page in the EPSS.

The EPSS of the present invention uses data files that are on the order of about 30 Kb. A data file used in the EPSS of the present invention contains the heading and text displayed by the graphical user interface (GUI), along with information telling the GUI which page type to display. Different page types are discussed in the authoring mechanism section below. Each data file can be classified by its corresponding knowledge base, sub-environment (assessment, learn, research, etc.), module, and page. This organization allows for a hierarchical directory structure, in which the knowledge base, sub-environment, and module are directory names and the page is a data file under the appropriate module sub-directory. For example, a PC might reference a data file as "c:kn_base1\learn\module1\page1.dat." This path name identifies "page1.dat" as the instructional content created for the learn sub-environment that covers a topic in the first knowledge base and module. As another example, the quiz link string 51 in FIG. 5 shows that the page being linked is the fourth learn page in the first module of the "Demo" knowledge base (the "Headings@1@Heading" portion of the string is supplemental information).

The server holds the knowledge base material, such as the authored instructional content and research library documents, in the data files. If the EPSS is set up on an intranet network, then the files relating to the user interface, such as Java class files, could reside either on the client or server side. Keeping the user interface files on the client side results in a faster response time over the network, since only the small data files will travel from the server to the client. If the class files and data files both reside on the server side, which is the case if the EPSS is installed on an internet network, then a slightly longer response time results.

User Interface

Netscape's Internet Foundation Classes (IFC) 1.1.1, which provide greater functionality than Java's Abstract Windowing Toolkit, can implement the EPSS GUI. These classes contain the necessary elements for constructing a GUI, including graphics, GUI components (buttons, menus, lists, etc.), event handling, and communication.

Figure 2:
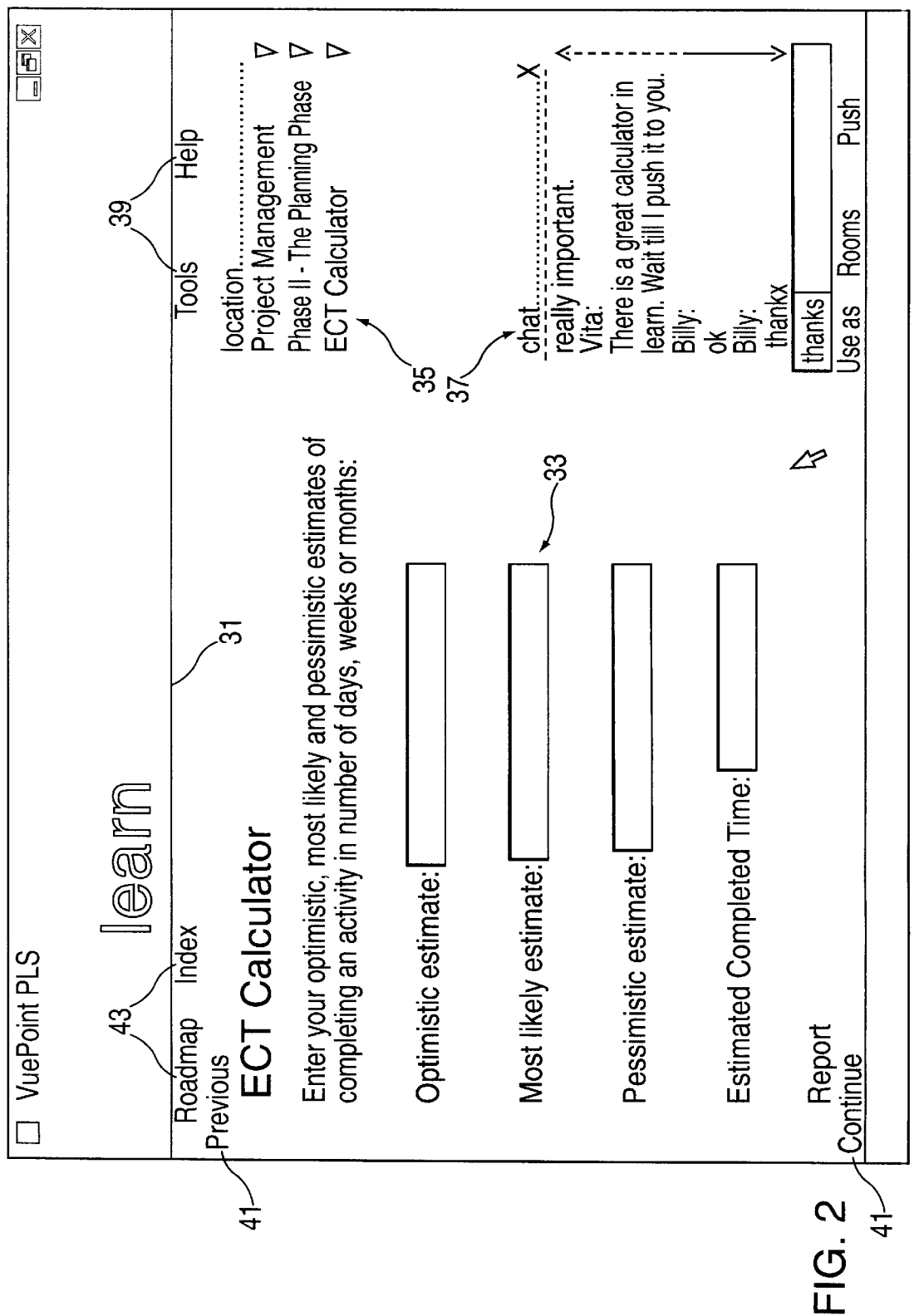
FIG. 2 is an EPSS graphical user interface illustrating the chat and push features of the communication system.

FIG. 2 displays an example of an EPSS GUI. The user can access the learning environment 4 by clicking on the appropriate name in the environment menu 31. In this figure, 'my way' refers to the assessment mechanism 5, 'learn' refers to the learning mechanism 7, 'research' refers to the research library 9, and 'communicate' refers to the communication system 11. Each of these sub-environments display their content on the content screen 33, which is provided on the display of terminal 10, and users can switch to different screens with the navigation controls 41. Users may invoke the teaching tools of each sub-environment through its teaching menu 43. A location manager 35 can display the current knowledge base, module and page names, and enable the user to jump to any location in the knowledge base. Utility functions 39 could enable users to save a link, or bookmark, to a specific page or content screen 33, to view the history of the pages they have accessed, and to refresh the screen. The utility functions 39 can also include a help function that provides a tutorial and a searchable sub-environment that explains the EPSS. The context-sensitive menus, navigation controls, location manager, and utility functions may be implemented using conventional programming techniques.

Authoring Mechanism

The authoring mechanism 1 enables non-programmer authors to create interactive courses by entering instructional content into one or more knowledge bases 3. As explained above, a non-programmer author may be, for example, a college professor who wishes to assess and improve his students' knowledge on a particular topic, or a business manager who wishes to train his employees to learn a new product line or improve their salesmanship abilities.

Figure 3:
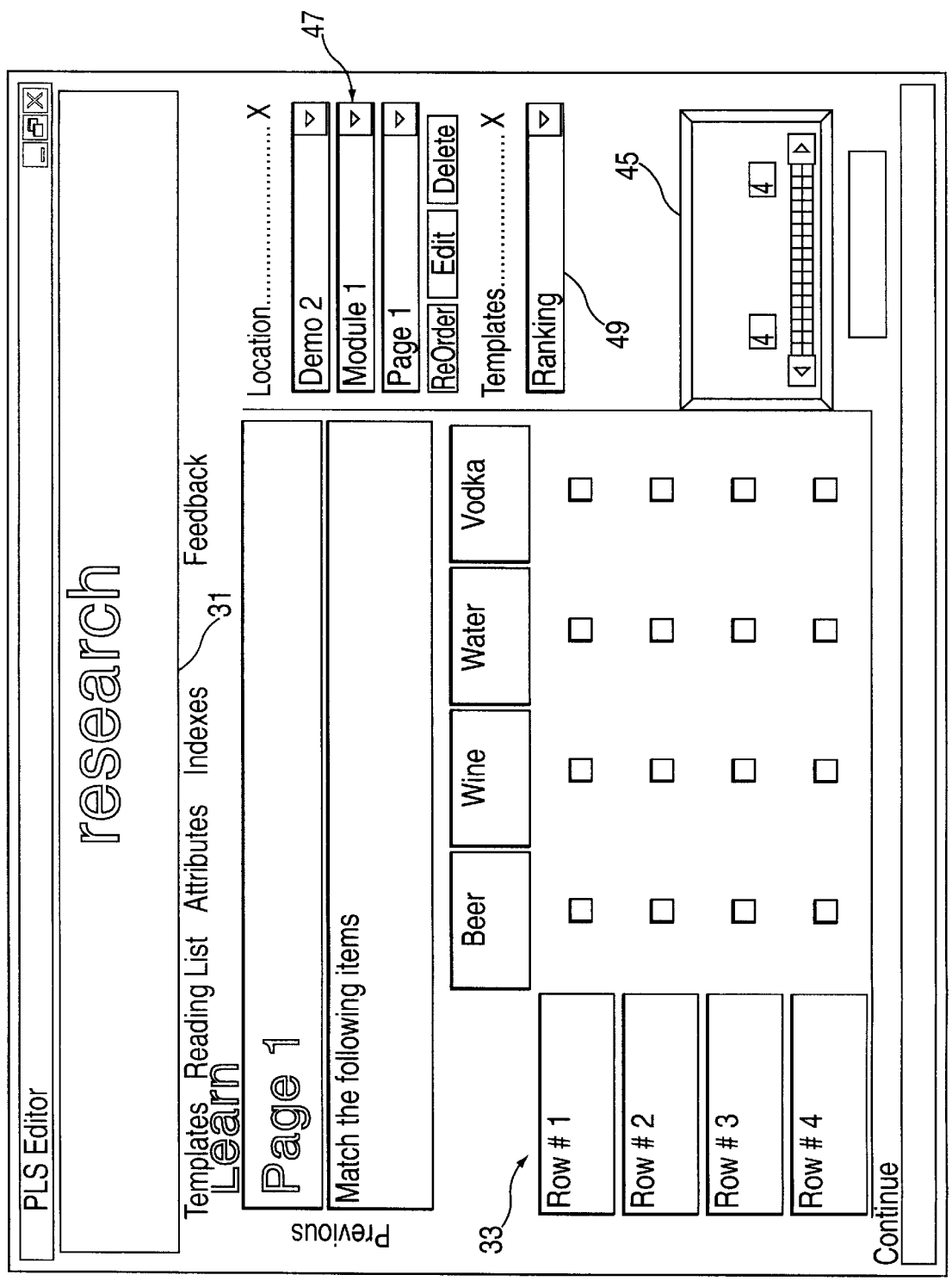
FIG. 3 is an EPSS graphical user interface illustrating the authoring mechanism.
Figure 4:
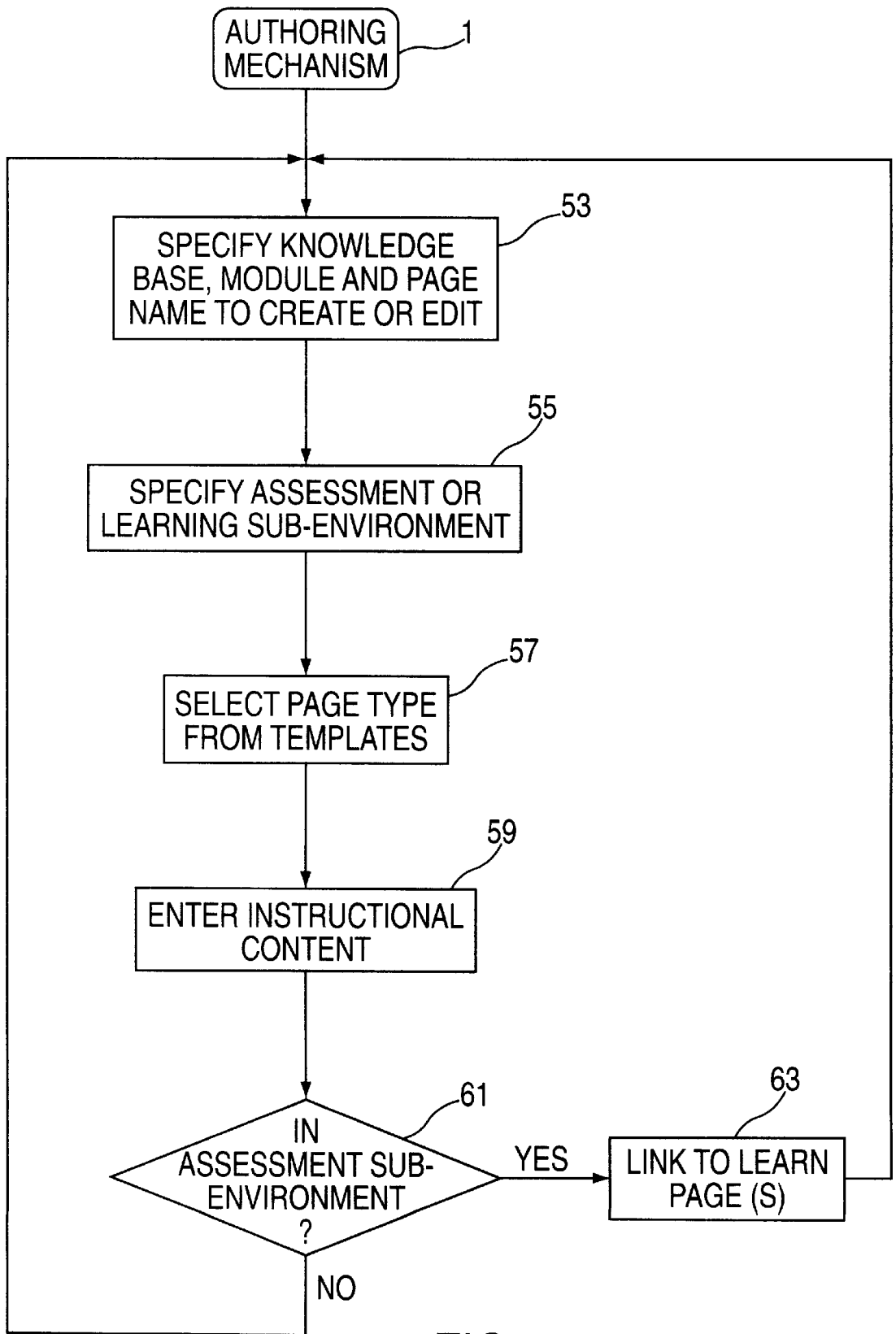
FIG. 4 is a flow diagram illustrating the operation of the authoring mechanism.

FIG. 4 illustrates the steps that a content developer, or author, takes in order to input instructional content into the EPSS. The author begins by entering into a screen like FIG. 3. The author then proceeds to the location manager editor 47, in which the author can specify the name of the knowledge base, module, and page to create or edit (step 53). On the screen in FIG. 3 these names are "Demo 2," "Module 1," and "Page1," respectively. Once this information is specified, the author chooses whether to create or edit this page as an assessment page or learn page by clicking on the appropriate name in the environment menu 31 (step 55). After this is chosen, the author may select from a list of templates 49 a page type to create or edit (step 57).

Templates for creating assessment or learning mechanism pages can include multiple interactive question types, such as multiple choice, drag and drop, fill in the blank, drop down lists, and ranking, for example. The interactive question type selected in FIG. 3 is ranking. Once a question type is selected, an editable template appears in the content screen 33 which could be driven by an orientation manager 45. An orientation manager 45 enables the author to specify attributes of the template, such as the number and sizing of rows and columns in the ranking template. The author may edit the title and instructions for the question, and then choose the correct answer (step 59). The author may also type the reasons for the correct answer in a feedback region accessible to users, so that they may learn from the question.

The interactive questions created for the assessment mechanism serve a different purpose than those created for the learning mechanism. An assessment page tests a user's understanding of a particular topic in the knowledge base. A learn page teaches the user about that topic. If a user skips or answers incorrectly a question in the assessment mechanism, the EPSS points the user to a learn page that discusses that topic. Thus, the author first creates the learn pages for the knowledge base. Then, after the author creates an assessment page (step 61), the authoring mechanism enables the author to link that question to the corresponding learn module and page, as shown in FIG. 5 (step 63). The EPSS creates a link internally by placing in a page map file a string formed by the concatenation of the path names of the two files to be linked. The path names and directory structure are discussed in the file management section above.

Figure 6:
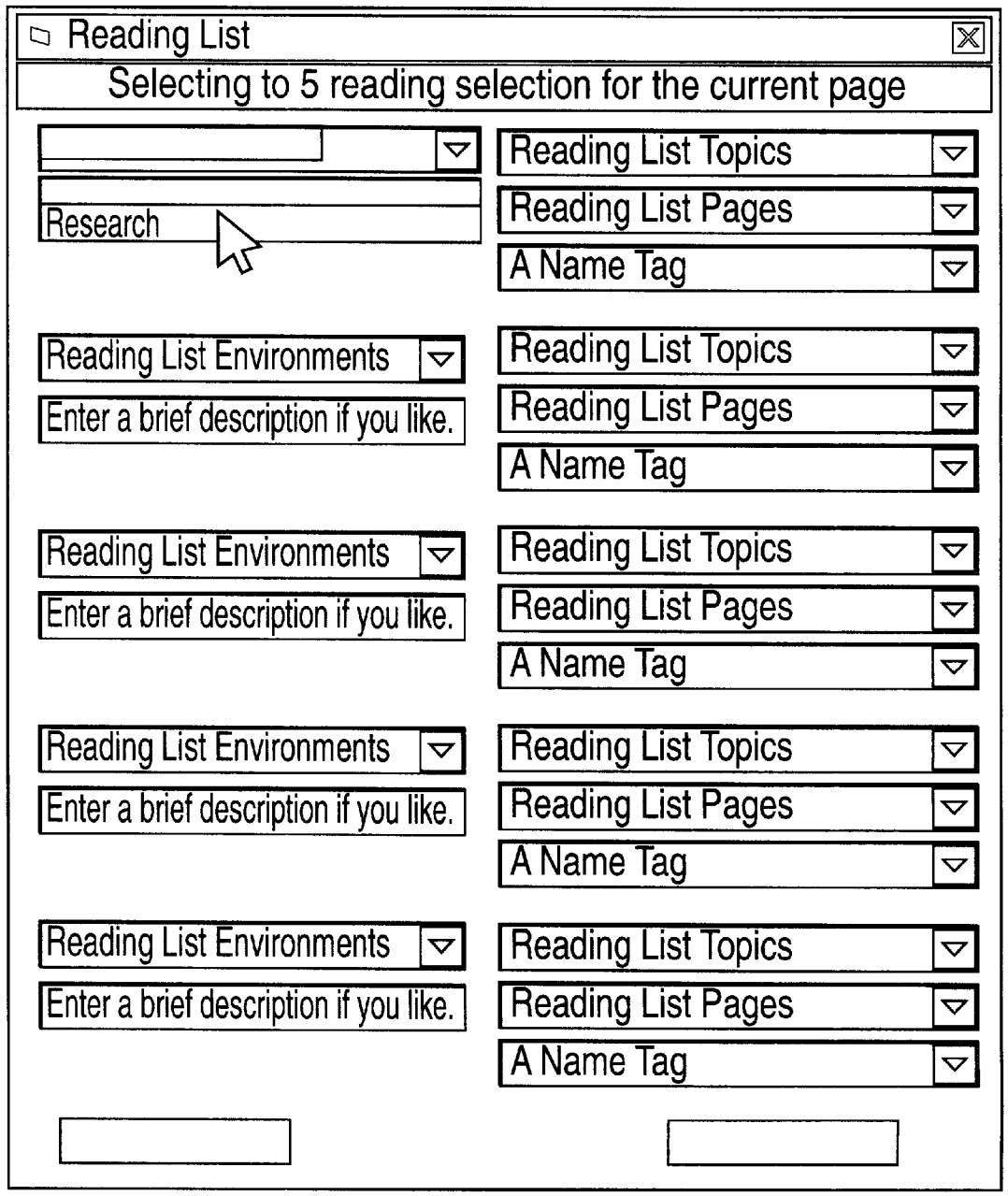
FIG. 6 is a graphical user interface for linking a learn page with another learn page or a document in the research library.

Templates for creating learning mechanism pages also may be non-interactive and support a plain text or HTML page type. Authors could create text pages for introductions, conclusions, summaries, or brief lessons. Authors also could embed HTML code into a page so that a user can follow links to research sources on the Web. Furthermore, when creating learning mechanism pages, authors can link learn pages to other learn pages or to a reading list, as shown in FIG. 6. A reading list references documents in the research library 9 that pertain to the topic covered by the learn page. Authors can insert documents into the research library 9 through the authoring mechanism, or by saving them to the appropriate directory on the server.

Figure 7:
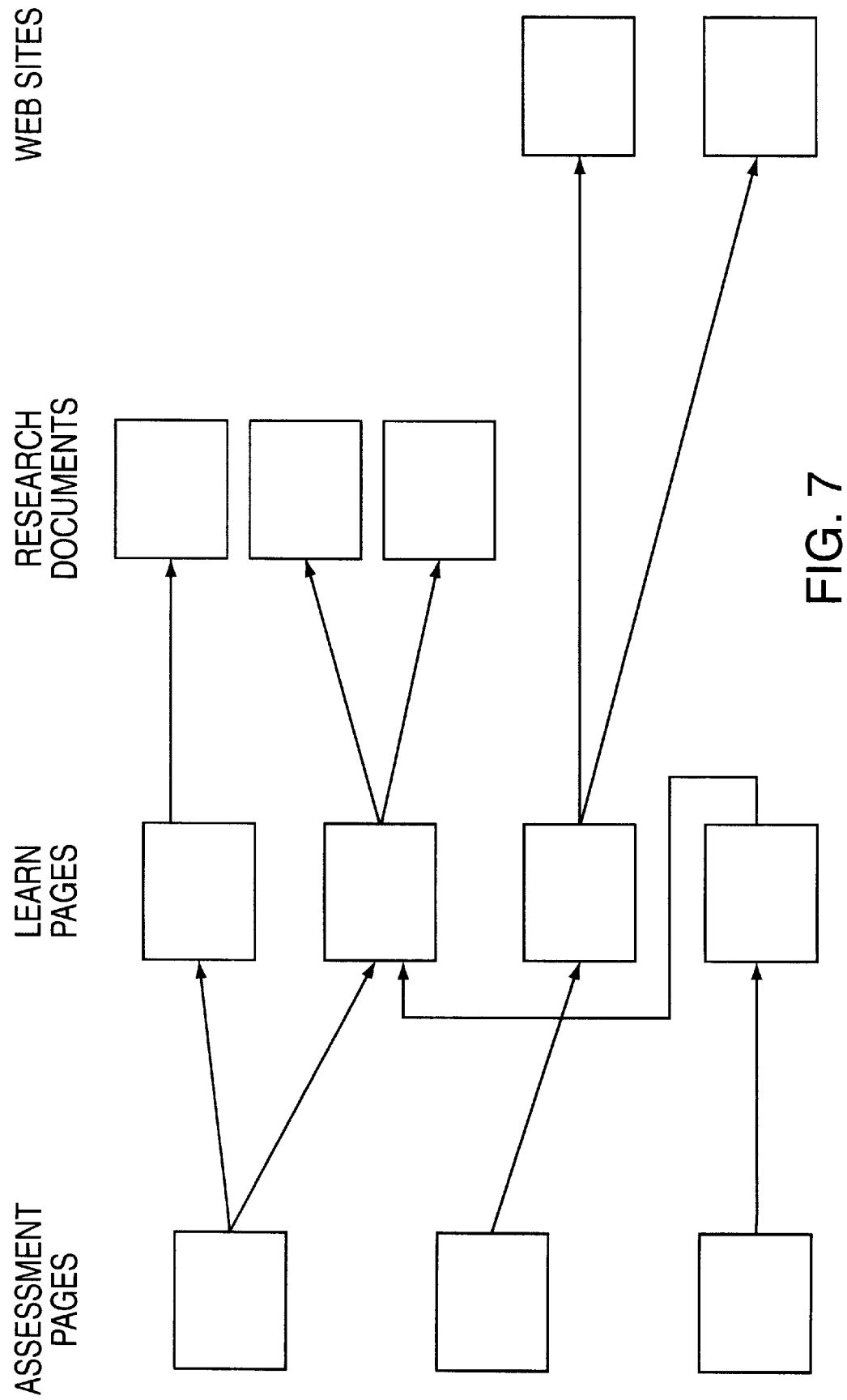
FIG. 7 is a schematic block diagram illustrating an exemplary set of linking relationships between the different EPSS sub-environments.

FIG. 7 illustrates an exemplary set of linking relationships between the different EPSS sub-environments. In the exemplary linking relationship illustrated in FIG. 7, each assessment page is linked to at least one learning page. Each learning page is further linked to documents that are provided in research library 9 or to Web sites on the Internet. Thus, for example, in a knowledge base relating to a physics course, each assessment page may present a question relating to a particular topic, such as, for example, the law of gravity. If a student who is interacting with the physics knowledge base incorrectly answers the assessment page question relating to the law of gravity, then, when the user is interacting with the learning mechanism 7, the learning mechanism 7 presents to the student those pages that are linked to the incorrectly answered assessment page. The assessment page relating to the law of gravity may be linked to learn pages that provide a basic review of the fundamental mathematical relationships that govern the Newtonian law of gravity; other learn pages linked to the incorrectly answered assessment page in this example may provide more advanced instruction on the same topic, such as how the Newtonian model was modified this century by the theory of relativity. These learn pages may in turn be linked to pages in the research library, which would provide even further details about the topic associated with the incorrectly answered assessment page. As seen in FIG. 7, links are also possible between learn pages and Web sites. It should be appreciated that the exemplary illustration of the linking relationships in FIG. 7 and the associated description thereof is presented not by way of limitation, but instead to illustrate the flexibility and broad applicability of the EPSS of the present invention. Thus, for example, instead of illustrating linked pages that relate to scholastic topics, the linked pages may instead be used in a business that is a developing a new product line and wishes to systematically educate its workforce on the new product line.

With respect to the page hierarchy of FIG. 7, when the author saves a page, the EPSS stores the relevant information in a data file in the appropriate directory on the server. The EPSS displays pages by sending a message to the server instructing it to send back the appropriate data file for display.

Assessment Mechanism

The assessment mechanism 5 measures a user's understanding of the current knowledge base 3 and creates a customized pathway of instruction based on the user's understanding of the contents of the knowledge base 3, as measured by the assessment mechanism 5. The previous section discussed how to create assessment pages, and this section discusses how the assessment pages are used to arrive at a customized pathway of instruction for each user.

Figure 8:
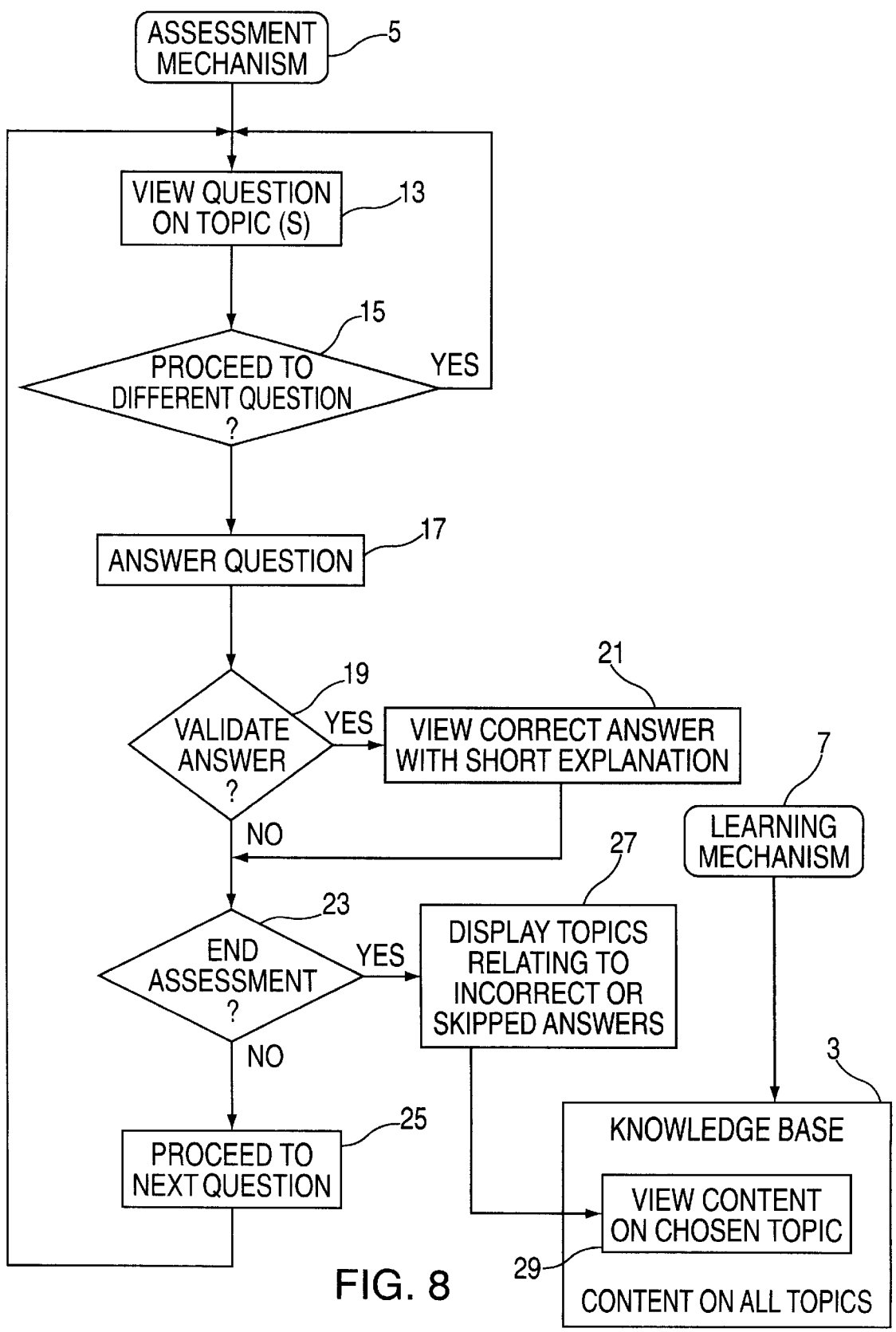
FIG. 8 is a flow diagram illustrating the operation of the learning environment.

FIG. 8 shows the integration of the assessment mechanism 5 with the learning mechanism 7 from the user's perspective. In the assessment mechanism 5, the user views a question in the content screen 33 on a topic related to the subject matter of the knowledge base 3 (step 13). As explained above, this question may be embodied as an assessment page. After viewing the question, the user may skip to the next or previous question (step 15) using the navigation controls 41. If the user answers the question (step 17), the user has the option of validating the answer immediately (step 19). If the user chooses the validation, the assessment mechanism 5 displays the correct answer accompanied by a short explanation (step 21) in the feedback region. After finishing each question, the user may choose to end the assessment (step 23). If the user continues, the assessment mechanism 5 presents another question (step 25). After the user is finished, the assessment mechanism 5 displays only the topics in the knowledge base 3 relating to the questions that the user either failed to answer or answered incorrectly (step 29). When the user selects one of these topics, the EPSS links the user to the learn page or pages devoted to that topic. Internally, the EPSS follows the link by looking up the path name of the learn page in the appropriate page map file, as described above in the authoring mechanism section. The user does not have to follow the exact pathway displayed by the assessment mechanism 5. The displayed topic list permits a user to choose any topic of interest, and following links to other resources is optional. The next section describes the learning mechanism 7.

Learning Mechanism

The learning mechanism 7 teaches the user through authored instructional content and documents from the research library 9. The authoring mechanism section above discussed how to create learn pages, and this section discusses the learning mechanism's 7 functionality.

If the user enters directly into the learning mechanism 7 without first going through the assessment mechanism, it displays a listing of all of the topics in the knowledge base. When the user selects a topic, the learning mechanism 7 links the user to the learn page or pages devoted to that topic, as explained in the previous section. The learn pages may include, for example, of interactive questions, text-based explanations, HTML documents, and links either to other learn pages or to the research library, as explained above in the authoring mechanism. The previous section explains how the assessment mechanism 5 relates to the learning mechanism 7.

Research Library

The research library 9 contains in-depth reference documents and resources that augment the learn pages for a knowledge base 3. The authoring mechanism section above describes how to enter these resources into the EPSS. A partial list of documents include, for example, books, articles, Web Sites, video clips, and spreadsheets. The research library 9 can also benefit from a search engine, like Microsoft Index Server, for example, to help the user access information in the library 9 or the learn pages.

Communication System

The communication system 11 allows users to communicate directly with one another on a variety of subjects. The on-line communication system 11 may be implemented, along with a bulletin board feature, by using Netscape IFC 1.1.1.

The on-line communication system 11 enables users to communicate with other users currently on the system and hold a line-by-line chat conference 37 with them. As seen in FIG. 2, the chat conference may occupy a particular portion of the display screen. Since the chat conference does not obstruct the content screen 33, a user can navigate anywhere in the EPSS while communicating. To help users learn by communication, the communication system 11 could permit users to send, or "push," a learn, research, or assessment page from their content screens 33 to any one of the other users' content screens 33. The communication system 11 would accomplish this by sending a message to the server instructing it to broadcast the specified data file to all clients. The recipients of this "push" can then access this page and follow its links as if they pulled it up themselves.

A bulletin board service (BBS) would allow users to communicate with their peers who are not logged on to the EPSS. With a BBS, users can post messages to any user on any topic.

As explained before, the present invention is intended to embody a seamlessly integrated combination of multiple environments intended to systematically assess each user's knowledge on several topics and, based on this assessment, present each user with a customized course of instruction particularly tailored to address those topics for which each user was assessed as being insufficiently knowledgeable. Therefore, in keeping with the broad range of applicability of the present invention, it is to be appreciated that the description presented herein is but one particular manner in which the fundamental concepts of the present invention may be implemented.

What is claimed is:

1. A method of providing to at least one person an individualized course of instruction, comprising the steps of:

a) authoring at least one knowledge base relating to a predetermined topic, wherein the authored knowledge base is associated with a learning environment including an assessment mechanism, a research library, and a learning mechanism;

b) activating the assessment mechanism to assess a knowledgeability of the at least one person on the predetermined topic before the at least one person receives instruction relating to the predetermined topic, wherein the assessment mechanism determines for the at least one person an associated set of sub-topics selected from a set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic;

c) accessing for each sub-topic a set of resource materials for instructing the person on the associated sub-topic, wherein each set of resource materials is accessed from at least one of the learning mechanism and the research library; and d) after the assessment is completed, presenting to the person the set of resource materials relating to each determined sub-topic.

2. The method of claim 1, wherein the step a) comprises:

i) creating a plurality of pages in the assessment mechanism, each page comprising an assessment tool for evaluating knowledge on at least one sub-topic;

ii) loading the set of resource materials into the learning mechanism and the research library, wherein the resource materials comprise a plurality of data items; and iii) linking each one of the plurality of data items to at least one of the plurality of pages.

3. The method of claim 2, wherein each assessment tool comprises one of a multiple-choice question, a fill-in-the-blank question, a drag-and-drop question, a ranking inquiry, and a drop down list.

4. The method of claim 2, further comprising the step of linking at least one Web site to at least one data item from the set of resource materials.

5. The method of claim 2, wherein the step b) comprises:

iv) presenting the person with at least a portion of the plurality of pages of the authoring mechanism;

v) collecting from the person a response to at least a portion of the assessment tools in the plurality of pages; and vi) determining for the person which of the provided responses are incorrect.

6. The method of claim 5, wherein the step c) comprises:

vii) accessing for the person the data items linked to the pages that include the assessment tools for which the corresponding person provided incorrect responses.

7. The method of claim 1, further comprising the step of:

e) providing a communication medium through which multiple persons communicate with each other.

8. The method according to claim 7, further comprising the step of:

f) transmitting through the communication medium at least a portion of a set of resource materials presented originally to a first person to at least another person.

9. The method according to claim 7, wherein the communication medium provides a chat conference capability through which the multiple users communicate with each other.

10. The method according to claim 7, wherein the communication medium provides a bulletin board on which any of the multiple users are capable of posting messages.

11. The method according to claim 1, wherein:

a content of each associated set of sub-topics determined for each person differs from each other based on the assessed knowledgeability of each person.

12. The method according to claim 1, wherein the set of knowledge sources includes at least one of learn pages and Web-based documents.

13. The method according to claim 1, wherein the resource materials include at least one of a text document, a link to a Web site, and an animation file.

14. The method according to claim 1, further comprising the step of:

providing a search engine that performs a search of the resource materials based on at least one search query provided by a user.

15. A system for providing to at least one person an individualized course of instruction, comprising:

a) means for authoring at least one knowledge base relating to a predetermined topic, wherein the knowledge base comprises at least an assessment mechanism, a research library, and a learning mechanism;

b) means for activating the assessment mechanism to assess a knowledgeability of the at least one person on the predetermined topic before the at least one person receives instruction relating to the predetermined topic, wherein the assessment mechanism determines for the at least one person an associated set of sub-topics selected from a set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic;

c) means for accessing for each sub-topic a set of resource materials for instructing the person on the associated sub-topic, wherein each set of resource materials is accessed from at least one of the learning mechanism and the research library; and d) means for presenting to the person, after the assessment is completed, the set of resource materials relating to each determined sub-topic.

16. The system of claim 15, wherein the means for authoring comprises:

i) means for creating a plurality of pages in the assessment mechanism, each page comprising an assessment tool for evaluating knowledge on at least one sub-topic;

ii) means for loading the set of resource materials into the learning mechanism and the research library, wherein the resource materials comprise a plurality of data items; and iii) means for linking each one of the plurality of data items to at least one of the plurality of pages.

17. The system of claim 16, wherein each assessment tool comprises one of a multiple-choice question, a fill-in-the-blank question, a drag-and-drop question, a ranking inquiry, and a drop down list.

18. The system of claim 16, further comprising means for linking at least one Web site to at least one data item from the set of resource materials.

19. The system of claim 16, wherein the means for activating the assessment mechanism comprises:

iv) means for presenting the person with at least a portion of the plurality of pages of the authoring mechanism;

v) means for collecting from the person a response to at least a portion of the assessment tools in the plurality of pages; and vi) means for determining for the person which of the provided responses are incorrect.

20. The system of claim 19, wherein the means for accessing comprises:

vii) means for accessing for the person the data items linked to the pages that include the assessment tools for which the corresponding person provided incorrect responses.

21. The system of claim 15, further comprising:

e) a communication medium through which multiple persons communicate with each other.

22. The system of claim 21, further comprising f) means for transmitting through the communication medium at least a portion of a set of resource materials presented originally to a first person to at least another person.

23. A system for providing to at least one person an individualized course of instruction, comprising:

an authoring mechanism;

at least one knowledge base in communication with the authoring mechanism, the at least one knowledge base relating to a predetermined topic;

a learning environment in communication with the at least one knowledge base, wherein the learning environment comprises:

an assessment mechanism, a learning mechanism in communication with the assessment mechanism, and a research library in communication with the learning mechanism; and at least one terminal in communication with the learning environment, wherein the assessment mechanism determines for the at least one person an associated set of sub-topics selected from a set of knowledge sources before the at least one person receives instruction relating to the set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic.

24. The system of claim 23, wherein the learning environment further comprises a communication medium coupled to the at least one terminal.

25. A method of providing to at least one person an individualized course of instruction that is authored with respect to a predetermined topic as a knowledge base associated with a learning environment including at least an assessment mechanism, a research library, and a learning mechanism, the method comprising the steps of:

a) activating the assessment mechanism to assess a knowledgeability of the at least one person on the predetermined topic before the at least one person receives instruction relating to the predetermined topic, wherein the assessment mechanism determines for the at least one person an associated set of sub-topics selected from a set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic;

b) accessing for each sub-topic a set of resource materials for instructing the person on the associated sub-topic, wherein each set of resource materials is accessed from at least one of the learning mechanism and the research library; and c) after the assessment is completed, presenting to the person the set of resource materials relating to each determined sub-topic.

26. A system for providing to at least one person an individualized course of instruction that is authored with respect to a predetermined topic as a knowledge base associated with a learning environment including at least an assessment mechanism, a research library, and a learning mechanism, comprising:

a) an arrangement for activating the assessment mechanism to assess a knowledgeability of the at least one person on the predetermined topic before the at least one person receives instruction relating to the predetermined topic, wherein the assessment mechanism determines for the at least one person an associated set of sub-topics selected from a set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic;

b) an arrangement for accessing for each sub-topic a set of resource materials for instructing the person on the associated sub-topic, wherein each set of resource materials is accessed from at least one of the learning mechanism and the research library; and c) an arrangement for presenting to the person, after the assessment is completed, the set of resource materials relating to each determined sub-topic.

27. A storage medium including an individualized course of instruction that is authored with respect to a predetermined topic as a knowledge base associated with a learning environment including at least an assessment mechanism, a research library, and a learning mechanism, the storage medium causing a device to perform the steps of:

a) activating the assessment mechanism to assess a knowledgeability of the at least one person on the predetermined topic before the at least one person receives instruction relating to the predetermined topic, wherein the assessment mechanism determines for the at least one person an associated set of sub-topics selected from a set of knowledge sources, wherein the associated set of sub-topics relates to the predetermined topic, wherein a selection of which sub-topics to include in the associated set of sub-topics depends on the assessed knowledgeability of the at least one person, and wherein, during an assessment performed by the assessment mechanism, the assessment mechanism presents to the at least one person feedback information regarding the predetermined topic;

b) accessing for each sub-topic a set of resource materials for instructing the person on the associated sub-topic, wherein each set of resource materials is accessed from at least one of the learning mechanism and the research library; and c) after the assessment is completed, presenting to the person the set of resource materials relating to each determined sub-topic.

* * * * *